Sept. 29, 1942.   O. A. STRASSMAN   2,297,663
METHOD AND APPARATUS FOR MAKING RUBBER GOODS
Filed April 10, 1939   13 Sheets-Sheet 1
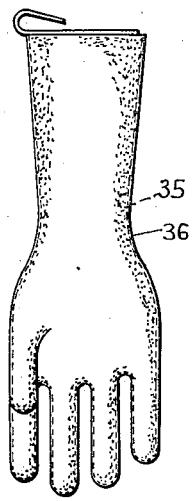
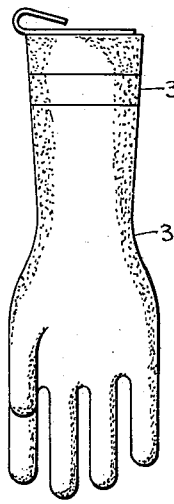
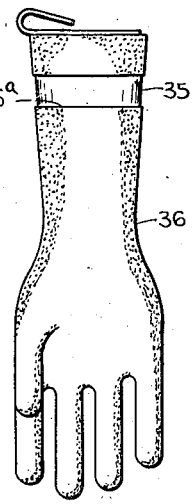
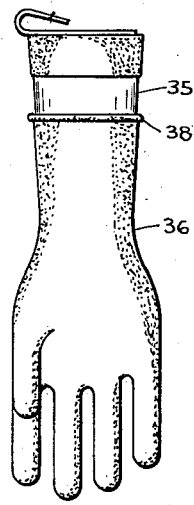
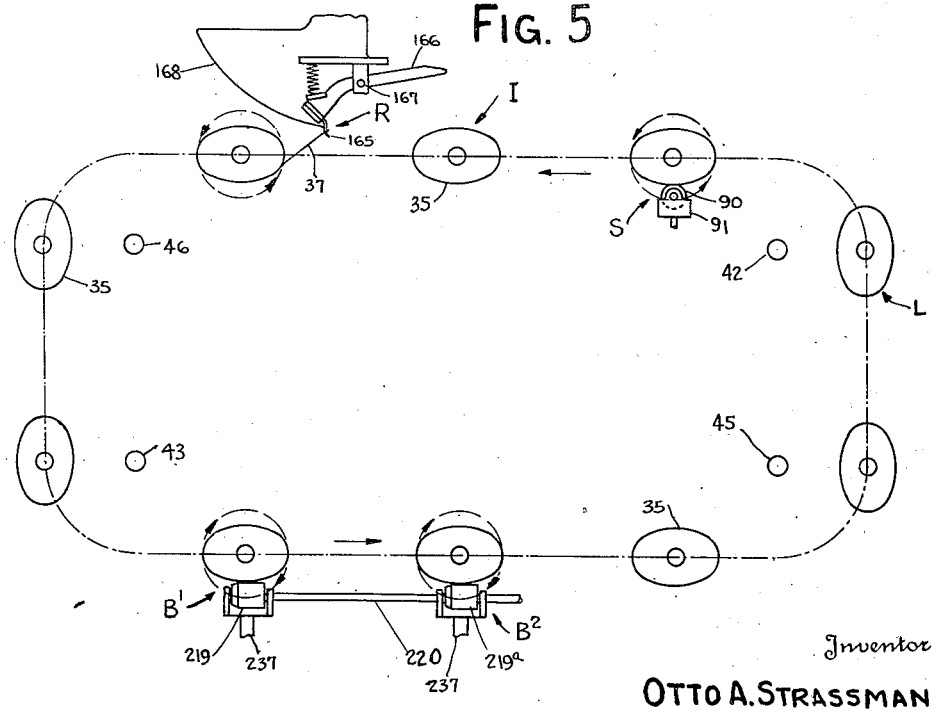
Inventor
OTTO A. STRASSMAN
By Ralph Barrow,
Attorney

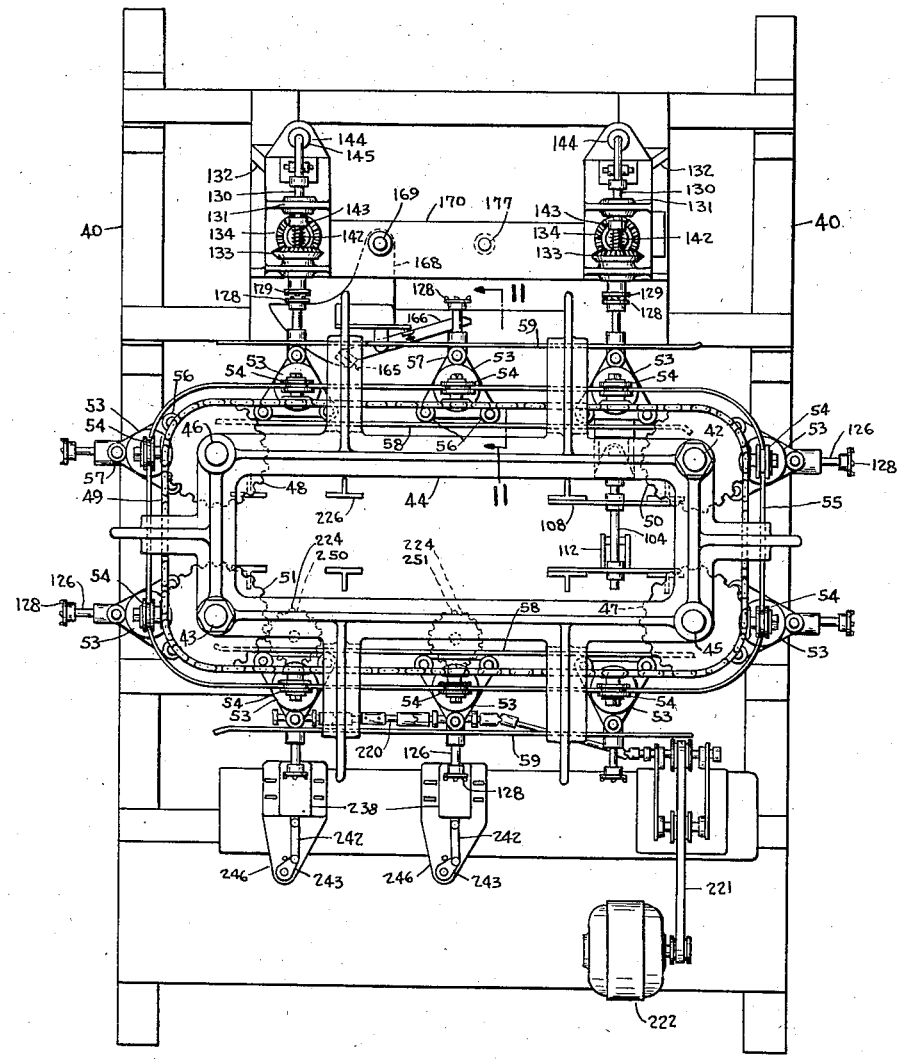

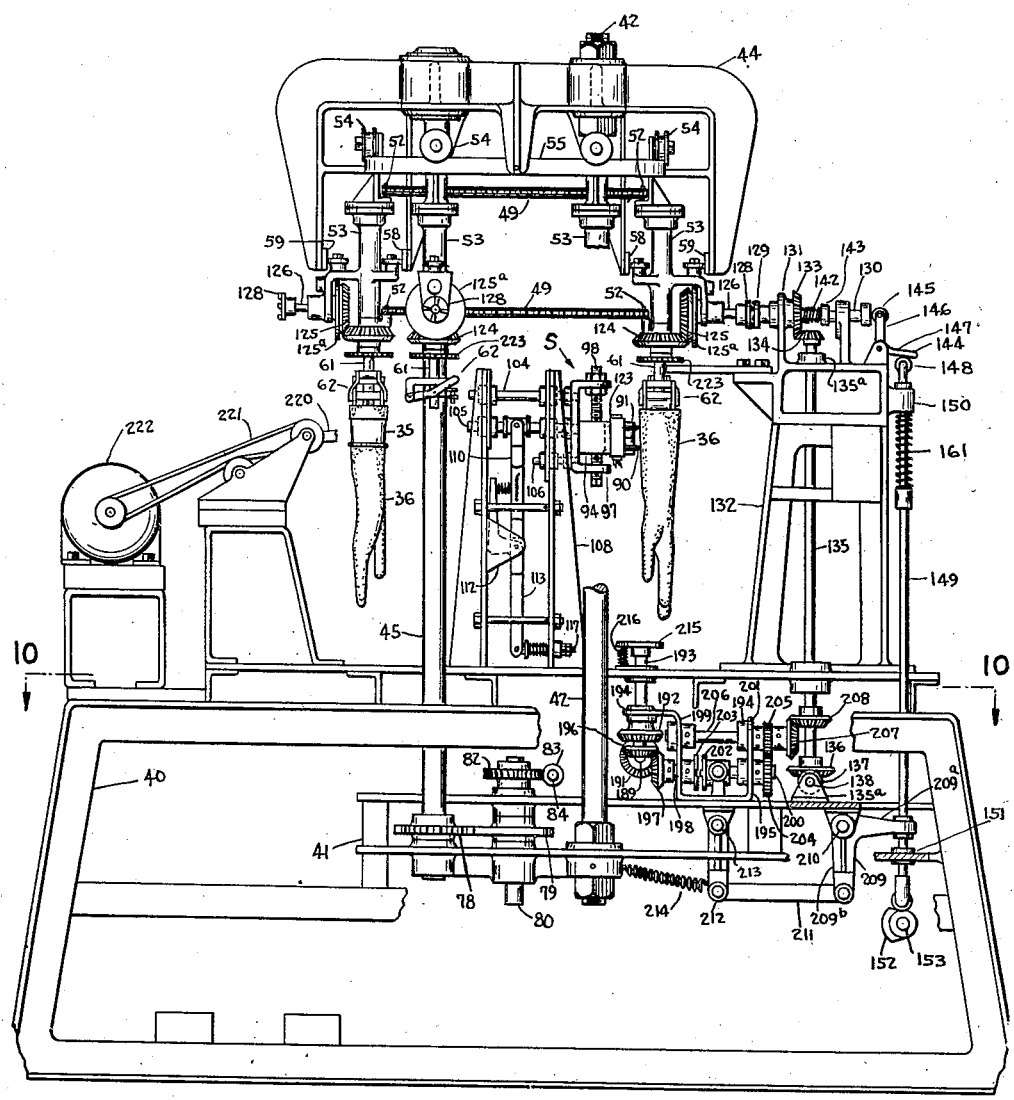

Sept. 29, 1942. O. A. STRASSMAN 2,297,663
METHOD AND APPARATUS FOR MAKING RUBBER GOODS
Filed April 10, 1939 13 Sheets-Sheet 6

INVENTOR
OTTO A. STRASSMAN
BY
*J. Ralph Barrow*
ATTORNEY

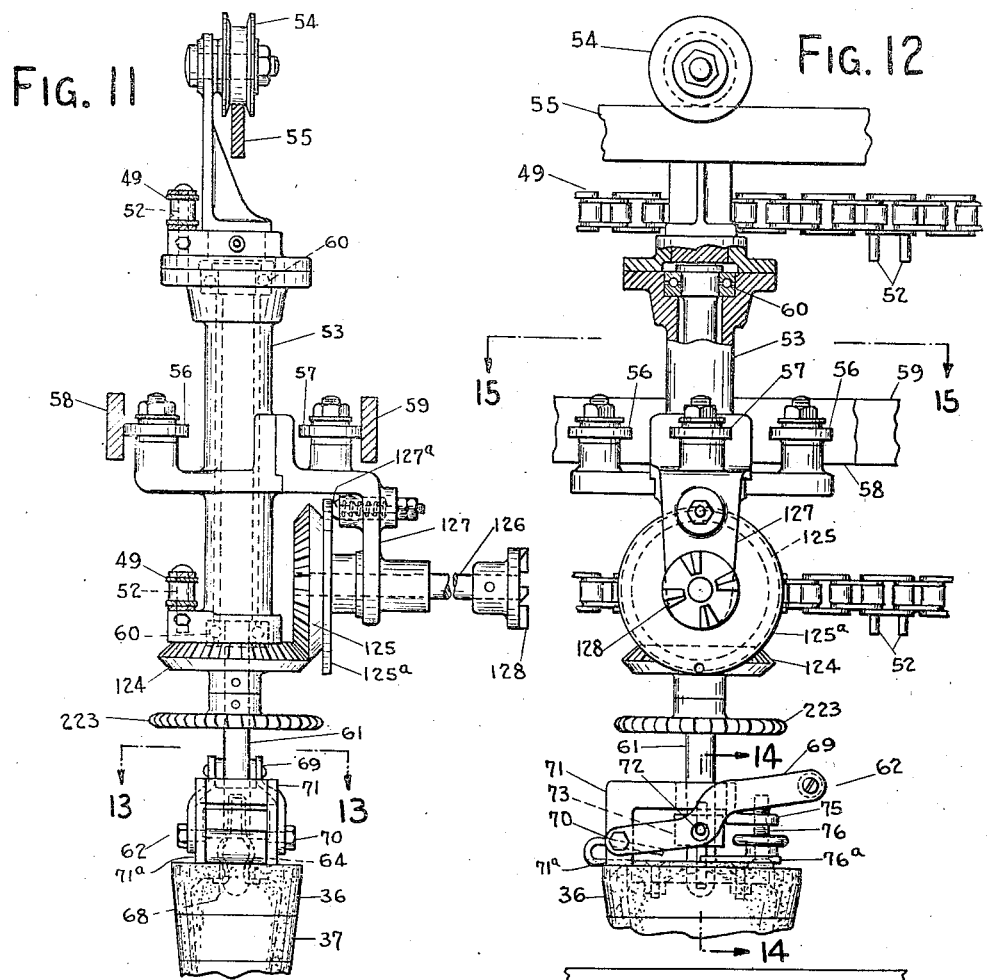
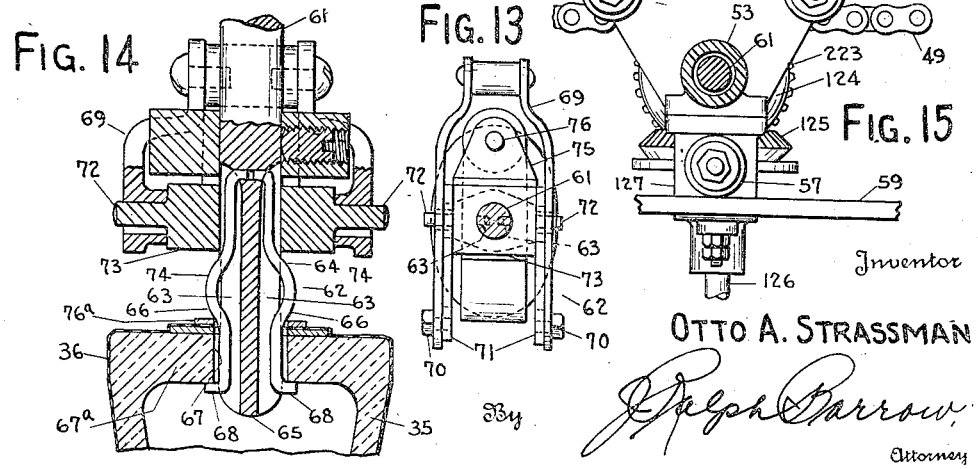

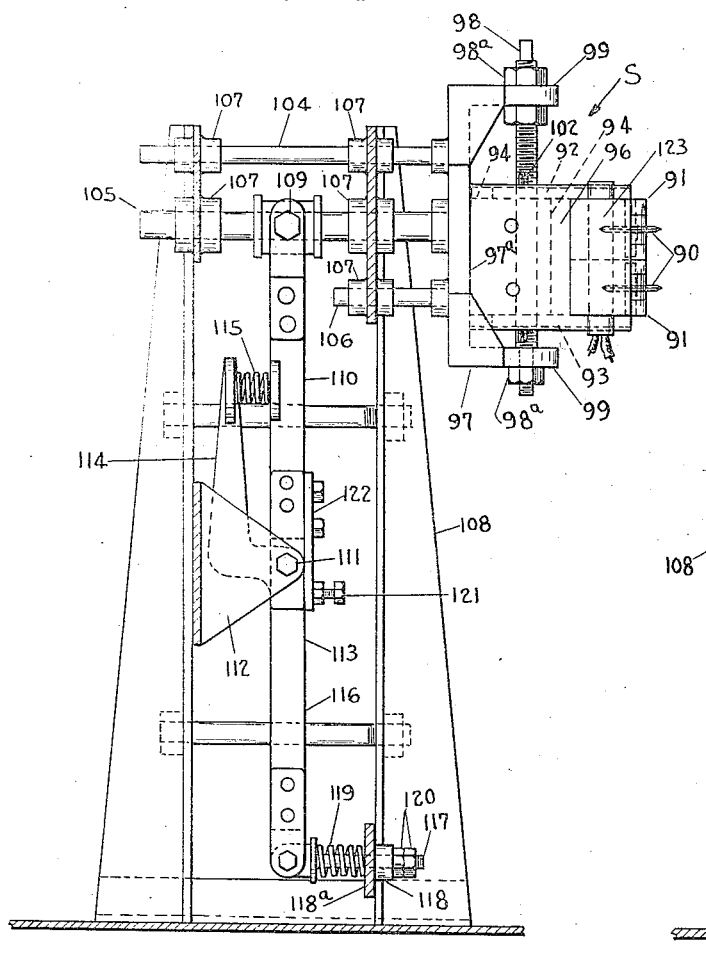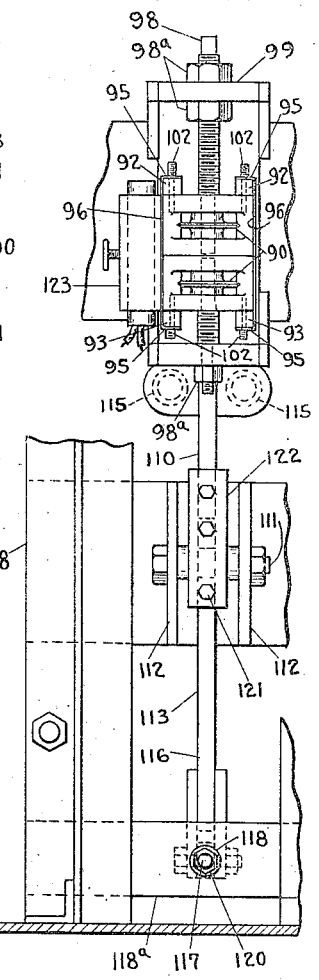

Sept. 29, 1942.   O. A. STRASSMAN   2,297,663
METHOD AND APPARATUS FOR MAKING RUBBER GOODS
Filed April 10, 1939   13 Sheets-Sheet 9

INVENTOR
OTTO A. STRASSMAN
BY
Ralph Barrow
ATTORNEY

Sept. 29, 1942. O. A. STRASSMAN 2,297,663
METHOD AND APPARATUS FOR MAKING RUBBER GOODS
Filed April 10, 1939 13 Sheets-Sheet 10
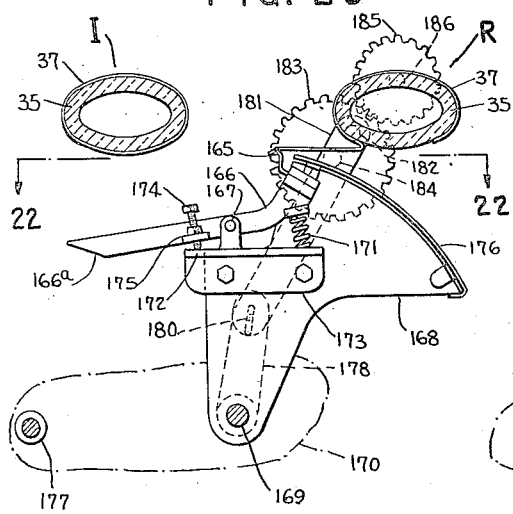
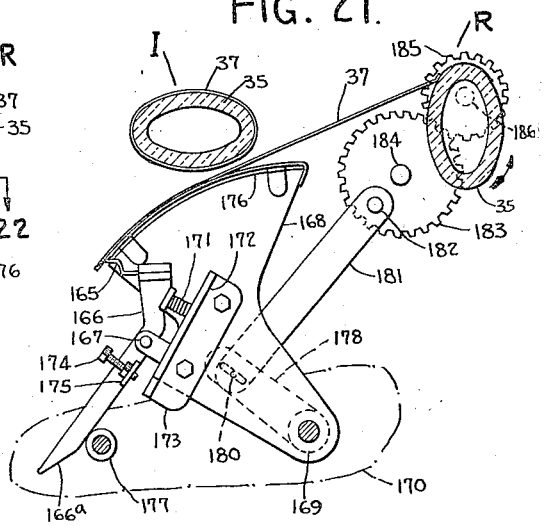
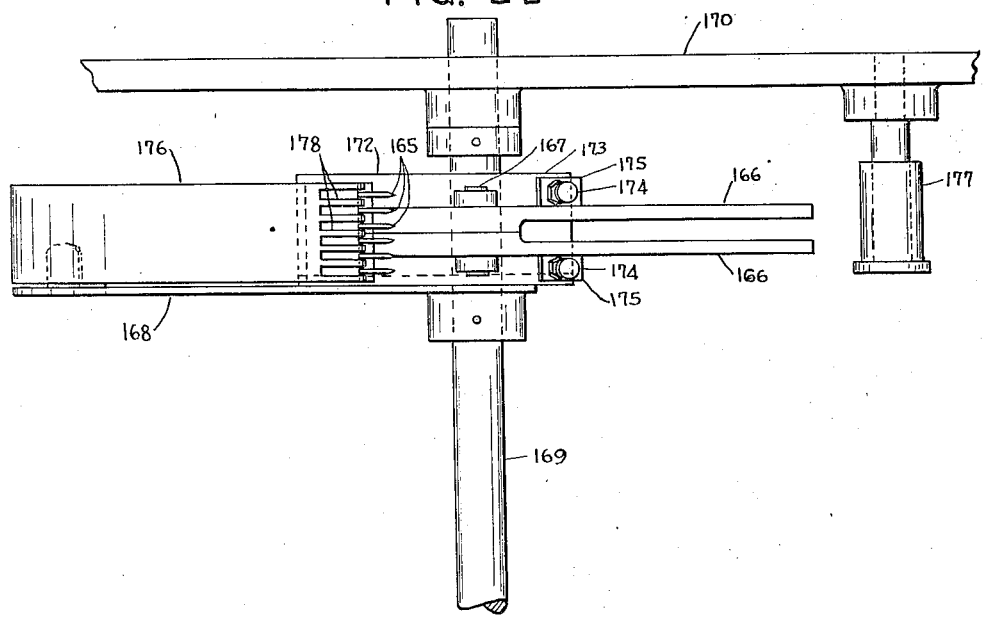
INVENTOR
OTTO A. STRASSMAN
BY
Ralph Barrow
ATTORNEY

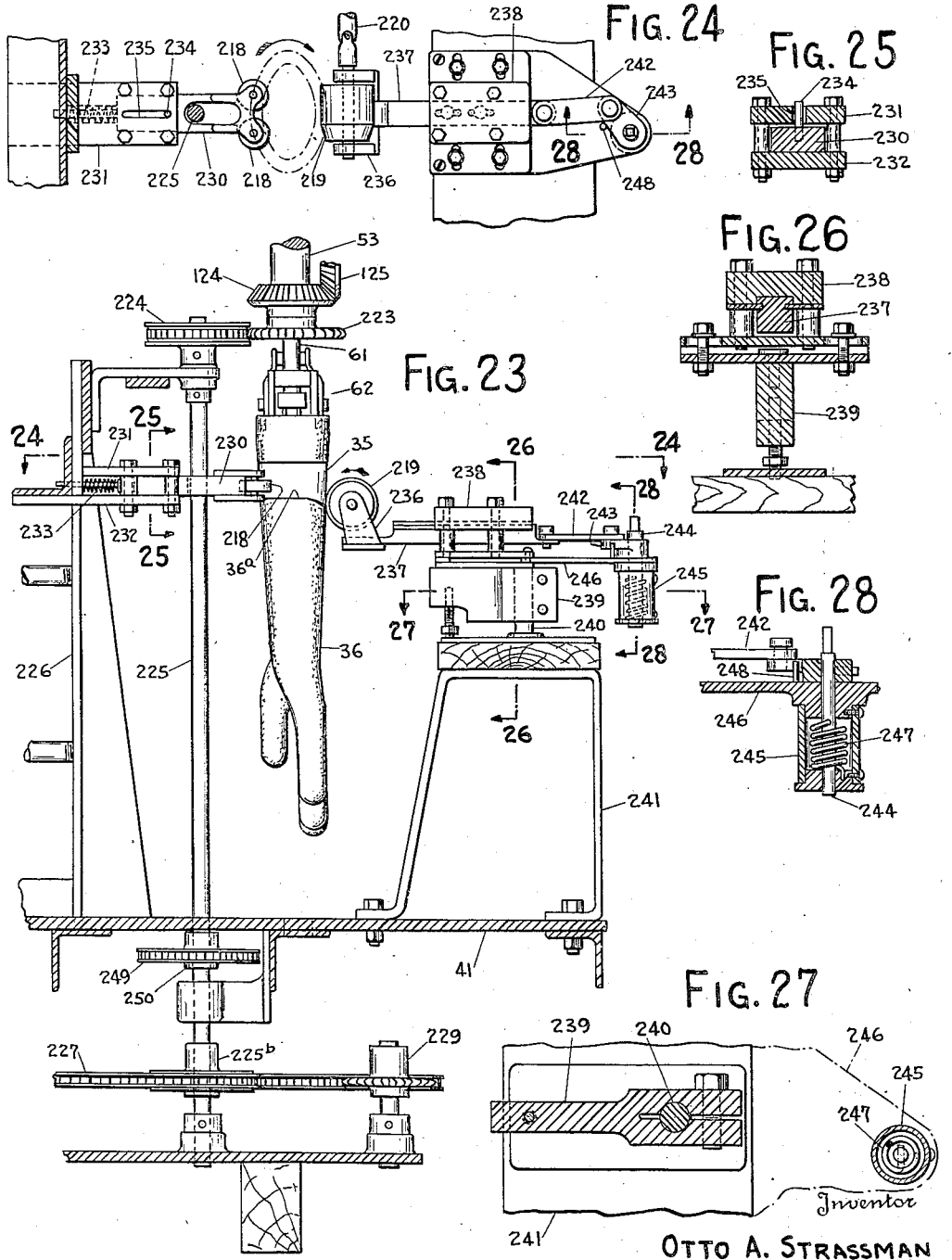

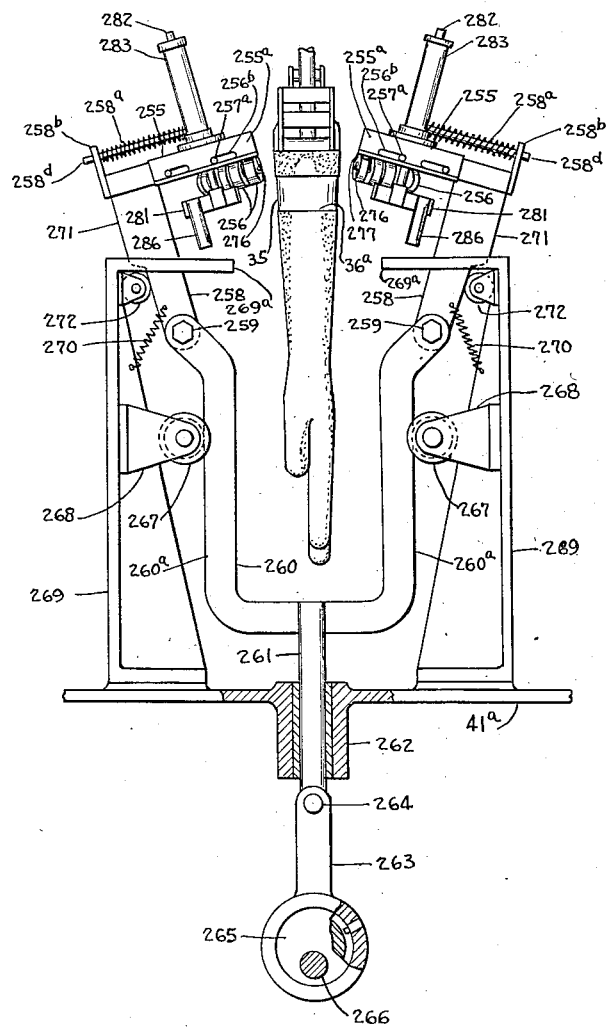
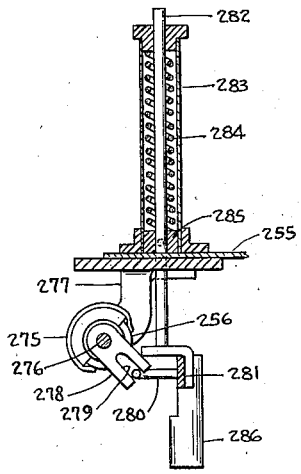
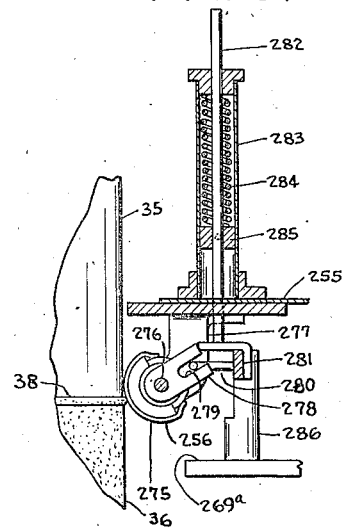

Sept. 29, 1942.     O. A. STRASSMAN     2,297,663
METHOD AND APPARATUS FOR MAKING RUBBER GOODS
Filed April 10, 1939     13 Sheets-Sheet 13
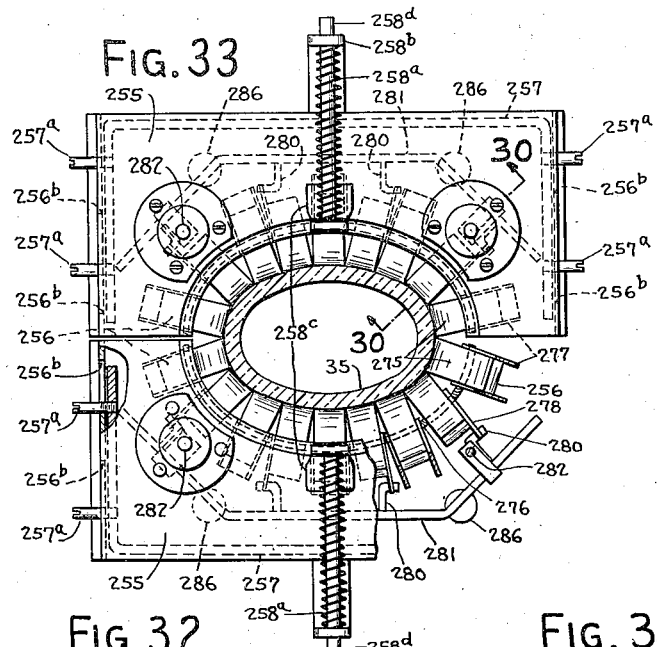
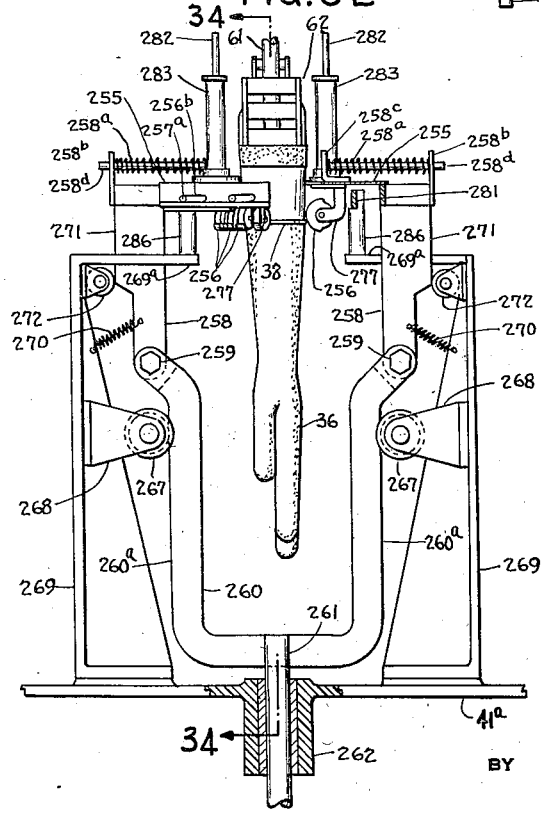
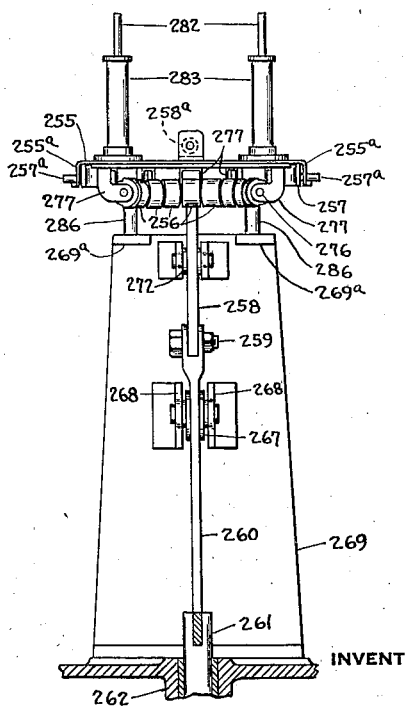
INVENTOR
OTTO A. STRASSMAN
BY
J. Ralph Barrow,
ATTORNEY Patented Sept. 29, 1942

2,297,663

UNITED STATES PATENT OFFICE 2,297,663

METHOD AND APPARATUS FOR MAKING RUBBER GOODS

Otto A. Strassman, Akron, Ohio, assignor to Seiberling Latex Products Company, Barberton, Ohio, a corporation of Ohio Application April 10, 1939, Serial No. 267,154

20 Claims. (Cl. 18—24)

This invention relates to apparatus for making deposited rubber goods, and in particular relates to methods and apparatus for finishing deposited rubber articles, such as rubber gloves or the like.

Heretofore, the finishing of rubber gloves and like articles made by dipping processes has been accomplished by a series of hand operations which include cutting the gloves on the form to length, removing the trimmings cut from the gloves and rolling reinforcing beads or rings of rubber at the edges of the wrists. It is the general purpose of the present invention to provide apparatus for carrying out these operations in a simple and inexpensive but highly effective manner whereby a more uniform and better product is obtained.

One object of the invention is to provide form-conveying apparatus of the character described and improved devices for rapidly and releasably attaching forms in operative positions in said apparatus at one station whereby they can be easily and quickly removed from said apparatus at another station.

Another object of the invention is to provide apparatus for trimming an article to length and more particularly cutting a peripheral strip about an article on a form which may be ovate or otherwise irregular in cross-section.

Another object of the invention is to provide in apparatus of the character described means including a plurality of cutting elements for successively cutting peripheral strips about articles mounted on a plurality of forms, and in which automatic adjustment is made to accommodate the cutting elements to variations in the shape or taper of the several forms.

Another object is to provide in apparatus of the character described improved means for removing the trimmed excess deposited rubber stock from the dipping forms.

Another object of the invention is to provide improved methods and apparatus for forming reinforcing beads at the open ends of hollow or deposited rubber articles, such as rubber gloves or the like.

Another object of the invention is to provide apparatus of the character described for forming reinforcing beads on hollow rubber articles which are ovate or otherwise irregular in cross-section.

Of the accompanying drawings:

Figures 1 to 4, inclusive, are views of deposited rubber gloves on their dipping forms, illustrating various stages of the process of forming the reinforcing beads on the gloves in accordance with the present invention.

Figure 5 is a diagrammatical plan view of the apparatus for performing the various operations illustrated in Figures 1 to 4, inclusive.

Figure 6 is a plan view of the apparatus embodying the invention.

Figure 7 is an end elevation, partly broken away in parts, of the apparatus shown in Figure 6, as viewed from the right thereof.

Figure 11 is a vertical cross-section taken substantially at 11—11 of Figure 6 illustrating the detail construction of one of the form-carrying heads.

Figure 12 is a side view thereof as viewed from the right of Figure 11.

Figure 13 is a cross-section taken on line 13—13 of Figure 11, showing in greater detail the form-locking mechanism.

Figure 14 is an enlarged cross-section, taken on line 14—14 of Figure 12, of the form-locking mechanism.

Figure 15 is a cross-section taken on line 15—15 of Figure 12, showing the form-carrying head guide means.

Figure 16 is a detail front elevation of the cutting or trimming mechanism in operative position.

Figure 17 is a side elevation as viewed from the right of Figure 16.

Figure 20 is a detail plan view, partly in section, of the strip removing mechanism, in the initial operative position thereof.

Figure 21 is a view similar to Figure 20 illustrating the mechanism in an intermediate position.

Figure 22 is a section taken substantially on line 22—22 of Figure 20, as viewed from the rear thereof.

Figure 23 is an enlarged detail view of the bead-rolling mechanism, shown at the right of Figure 9, in the initial stage of the bead-rolling operation.

Figure 24 is a cross-section taken substantially on line 24—24 of Figure 23, but showing the mechanism in inoperative position.

Figure 25 is a cross-section on line 25—25 of Figure 23.

Figure 26 is a cross-section on line 26—26 of Figure 23.

Figure 27 is a cross-section on line 27—27 of Figure 23.

Figure 28 is a cross-section on line 28—28 of Figure 23.

Figure 29 is a view, partly broken away and in section, of a modified form of bead-rolling mechanism in the inoperative position thereof.

Figure 30 is a vertical cross-section, taken substantially on line 30—30 of Figure 33, but with the mechanism illustrated in the inoperative positions shown in Figure 29.

Figure 31 is a view similar to Figure 30, taken substantially on line 31—31 of Figure 33, and illustrating the bead-rolling operation.

Figure 32 is a view, similar to Figure 29, showing the mechanism in bead-forming relation to a form.

Figure 33 is a top plan view, partly broken away and in section, of Figure 32.

Figure 34 is a cross-section taken substantially on line 34—34 of Figure 32, with the glove form removed.

Figure 8:
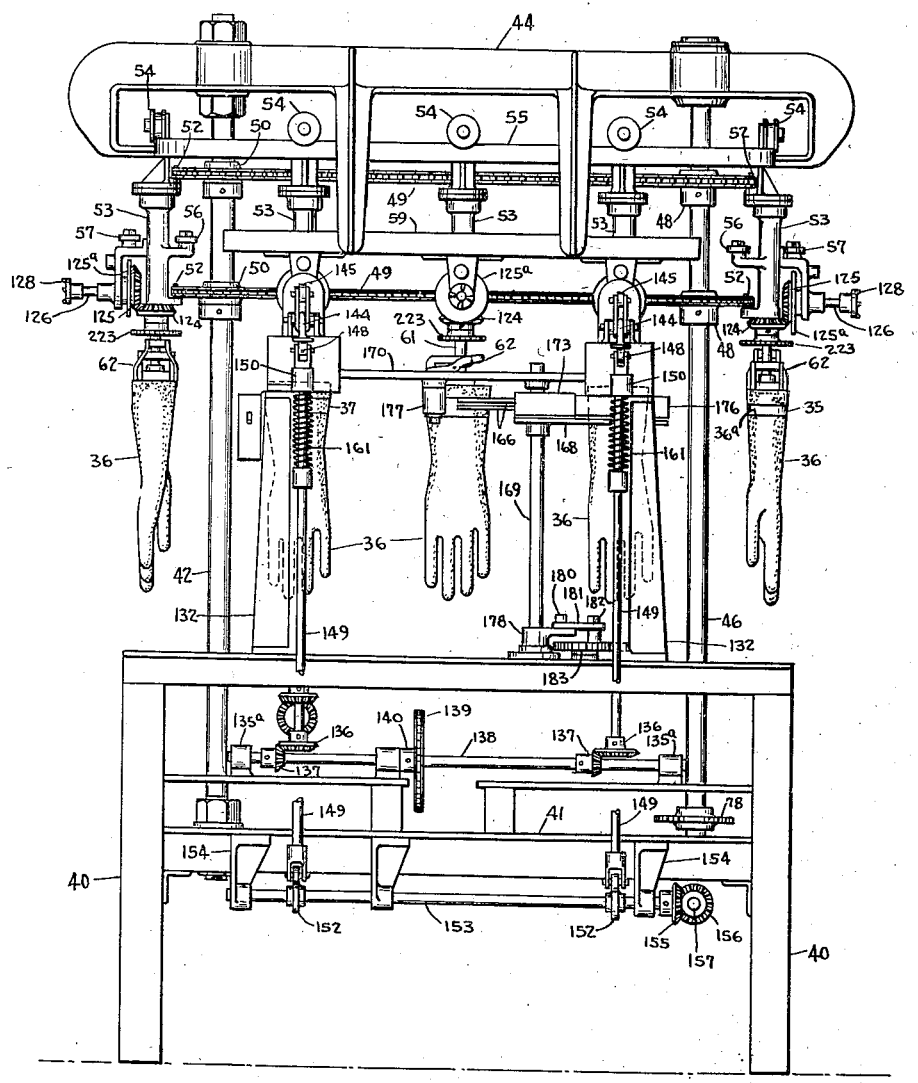
Figure 8 is an elevation of the apparatus shown in Figure 6, as viewed from the rear thereof.

Referring in particular to Figures 1 to 5, inclusive, briefly the process embodying the invention may comprise first supplying glove forms 35, to the apparatus at loading station L, these forms having thereon a thin coating 36 of rubber composition (see Figure 1), such as rubber latex or other acqueous dispersions of rubber, as will subsequently be described. Next the forms pass to a strip-cutting mechanism S where a strip 37 is cut (see Figure 2) at the wrist portion of the glove. The forms 35, after passing from station S, have the strips 37 removed therefrom at the strip removing station R, this operation providing a uniform top edge on the glove (see Figure 3), in preparation for rolling the reinforcing bead 38 (see Figure 4), at stations B¹ and B². After passing from the bead-rolling stations the forms may be removed and exposed to a suitable vulcanizing medium in suitable means (not shown), for curing the finished gloves on the forms.

In Figures 6 to 9, inclusive, the apparatus, shown diagrammatically in Figure 5, is illustrated in greater detail, all parts, except where otherwise noted, being shown in inoperative positions. The numeral 40 designates a suitable framework between which is mounted a support 41 for fixedly mounting a pair of upright rods 42, 43 which have secured on the upper ends thereof a suitably shaped bracket 44, the latter being additionally supported by a pair of shafts 45, 46 journalled at their upper and lower ends in bracket 44 and support 41, respectively. The shafts 45, 46 may be intermittently driven, by means subsequently to be described, in turn to drive pairs of sprockets 47, 47 and 48, 48 fixed in vertically spaced relation at the upper ends of shafts 45 and 46, respectively, thereby to drive a pair of endless chains 49, 49 engaged about said sprockets 47, 48 and pairs of similarly spaced idler sprockets 50, 50 and 51, 51 rotatably supported on the fixed rods 42 and 43, respectively.

Connected to chains 49, 49 at 52, 52 may be a series of spaced form-carrying heads 53 having rollers 54 at the upper end thereof for rolling engagement on an endless track 55, along which the heads 53 are carried in depending relation to the various operating stations (see Figures 11 and 12). As best shown in Figure 15, a pair of rollers 56, 56 suitably mounted on one side of each head 53, and roller 57 similarly mounted on the opposite side thereof are adapted to engage the inner surfaces of pairs of guide tracks 58, 58 and 59, 59, carried by frame 44, for retaining the heads in alignment while the same are in operative positions at the operating stations.

Journalled in bearings 60, 60 in each head 53 may be a shaft 61 rotatable, by means subsequently to be described, to turn the forms 35 thereon one or more revolutions at the operating stations S, R, B¹ and B². The downwardly extending end of shaft 61 preferably is provided with a quickly releasible clamping device 62 for retaining the forms 35 thereon. For this purpose, the end of shaft 61 preferably has oppositely disposed, longitudinally extending slots 63, 63 therein and a substantially U-shaped spring 64 may be secured in the connecting wall 65 between said slots so that the prongs 66 of the spring extend downwardly in the slots 63. The end of shaft 61 may be inserted in a suitable opening 67 in the top wall 67ª of the hollow form 35, while prongs 66 are pressed together against the yielding action thereof to permit outwardly extending flanged portions 68, 68 on the free ends of the prongs to pass through said opening, whereby when pressure on the prongs is released the flanges 68 will engage under the top wall 67ª of the form. A lever 69, pivotally connected at 70, 70 to a suitable bracket 71 secured to shaft 61, may be connected intermediate the ends thereof to pins 72, 72 extending from a block 73 slidably mounted on shaft 61, the arrangement being such that downward pressure applied to the free end of lever 69 urges block 73 downwardly to engage outwardly bulging portions 74 on the prongs 66 and urge the latter inwardly, thereby to allow the flanges 68 to be passed through the opening 67 in form 35. When the form 35 is positioned on shaft 61 in this manner the flanges 68 are engaged under wall 67ª by raising block 73 to permit the prongs 66 to expand outwardly, the block 73 being held in raised position by the bulged portions 74 on the prongs. A lug 75 extending from bracket 71 may have threaded therein an adjustable screw 76 for urging a shoeplate 76ª attached thereto and downwardly extending portions 71ª of bracket 71 against the top of form 35, thereby firmly to fix the form on shaft 61 by clamping wall 67ª of the form against the flanges 68. Similarly, the form is removed from shaft 61 by releasing shoe-plate 76ª and pressing downwardly on lever 69 to disengage flanges 68 from under wall 67ª of form 35.

Referring in particular to Figures 6 to 10, inclusive, shafts 45 and 46 may be intermittently driven, to drive chains 49 and thereby carry form-carrying heads 53 in succession to each operating station L, S, R, B¹ and B², respectively, at which stations the heads 53 pause a sufficient length of time to allow the respective operations to be performed (see Figure 5). To this end intermittent gears 78, 78, of known type, on the lower ends of shaft 45 and 46 are engageable with similar intermittent gears 79, 79 fixed on shafts 80, 81 suitably journalled in the support 41, the shafts 80, 81 having worm gears 82, 82 meshing with worms 83, 83 on spaced shafts 84, 85 in driving engagement with each other through gears 86, 86, and shaft 85 being driven through a reduction 87 by a suitable motor 89.

As best shown in Figures 7 and 16 to 19, inclusive, the forms 35 upon stopping at station S may yieldably engage a pair of heated disc knives 90, 90 rotatably mounted in a pair of relatively slidable blocks 91, 91 carried on the outer ends of pairs of upper and lower guide bars 92, 92 and 93, 93, respectively, which may be slidable between a central block 94 and inwardly extending flanges 95, 95 of a pair of side plates 96, 96 secured to opposite sides of block 94. The block 94 may be vertically adjustable on a bracket 97 to suit various types or lengths of gloves, by means of a shaft 98 threaded through block 94 and rotatable in lugs 99, 99 extending from bracket 97, the block 94 preferably having a flat face thereof in sliding engagement with the inner wall 97a of bracket 97, to prevent rotation of the block upon turning shaft 98 with a suitable tool (not shown). The knives may be retained in vertical adjustment by suitable means, such as nuts 98a on shaft 98.

Figure 19:
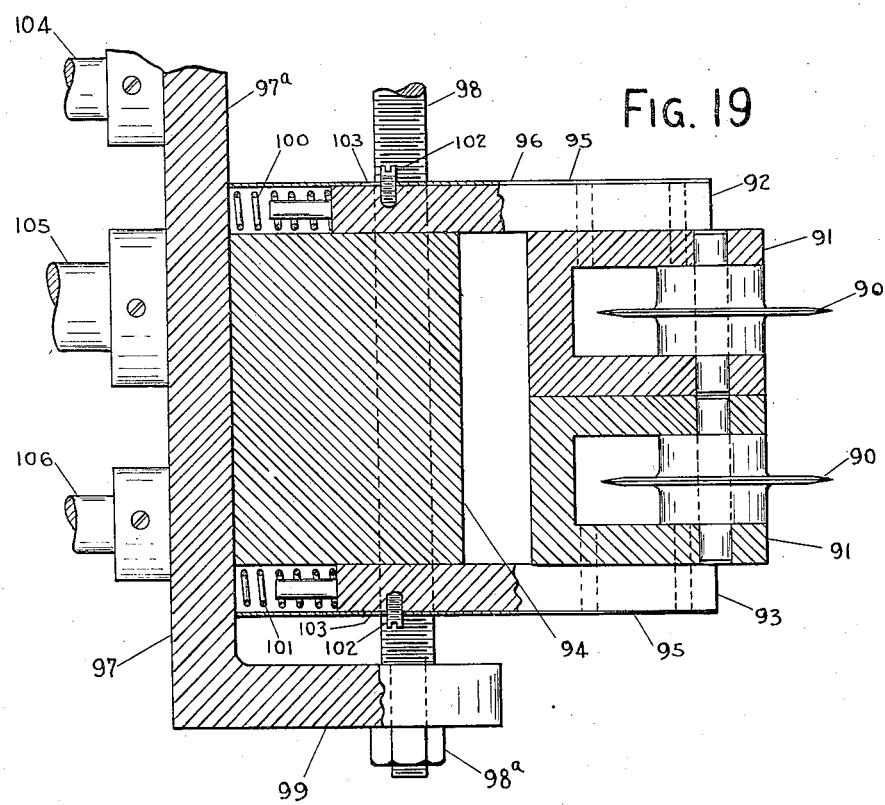
Figure 19 is a cross-section taken on line 19—19 of Figure 18.

Compression springs 100 and 101 may be extended between the bracket 97 and bars 92 and 93 yieldingly to urge the latter, and the knives carried thereby, outwardly until pins 102, 102 in bars 92, 93 engage the ends of slots 103, 103 in flanges 95 of side plates 96. In this position the knives or cutters 90 will be in predetermined alignment, substantially as shown in Figure 19. The action of springs 100 and 101 permits the knives 90 to be relatively and yieldably shiftable until limited by pins 102 engaging the other ends of slots 103, to accommodate slight variations in the downward taper at the wrist portions of the forms.

Additional yielding means may be provided to maintain the knives 90 in uniform contact with the forms 35, the latter being generally ovate in shape at the wrist portions about which the strip is cut from the rubber layer thereon by rotation of the forms against the knives. To this end, bracket 97 preferably is carried by laterally extending rods 104, 105 and 106 slidably supported in bearings 107, 107 in a suitable frame 108. Pivotally connected to rod 105 at 109 may be a downwardly extending arm 110 pivoted at its other end to a pin 111 between a pair of plates 112, 112 on frame 108. For providing yielding resistance against inward movement of bracket 97 a lever 113, pivoted intermediate its ends to pin 112, may have an upwardly extending off-set arm 114 yieldably urging arm 110 forwardly on pivot 111 against the action of compression springs 115, and a downwardly extending arm 116 on lever 113 preferably has pivoted on the end thereof a rod 117 which projects forwardly through boss 118 in a plate 118a carried by frame 108, a compression spring 119 being provided between plate 118a and the end of arm 116 normally yieldably to urge arm 116 inwardly, and therefore urging the knives 90 outwardly, until limited by nuts 120 on rod 117 abutting the boss 118. The yielding pressure against arm 110 may be adjusted through an adjusting screw 121 in a plate 122 secured to arm 110, screw 121 being in engagement with arm 113. Lateral adjustment of the normal stop position of bracket 97 may be accomplished by turning the nuts 120 on rod 117.

The knives 90 preferably are heated by conduction to a predetermined temperature, by means of a thermostatically controlled heater 123 secured against one of the side plates 96, to facilitate cutting through the rubber layer 36 on forms 35.

For revolving the forms 35 against the knives 90 while the same are paused at station S for a strip cutting operation, a bevel gear 124 keyed on shaft 61 depending from the head 53, may mesh with a bevel gear 125 on a horizontally extending shaft 126 journalled in a bracket 127 carried by head 53. A clutch member 128 on the outer end of shaft 126 is intermittently engageable with a cooperating clutch member 129 on a continuously driven shaft 130, journalled in bearings 131 of a bracket 132 mounted on frame 40. Shaft 130 is continuously driven by a bevel gear 133 on shaft 130 meshing with a bevel gear 134 on a shaft 135, journaled in bearings 135a in frame 132, engaging a gear 137 on a shaft 138, the latter being driven by a chain 139 extended about sprockets 140 and 141 on shaft 138 and the continuously driven shaft 85 respectively.

Shaft 130 is normally yieldably urged outwardly to retain clutch member 129 out of engagement with clutch member 128 on shaft 126, by means of a compression spring 142 extending between gear 133 and a collar 143 on shaft 130. Pivoted on bracket 132 is a bell-crank 144 having a roller 145 on one arm 146 engaging the outer end of shaft 130, and having another arm 147 engaged by a roller 148 on one end of a rod 149 slidably mounted in bearings 150 and 151 in bracket 132 and frame 40, respectively. Rod 149 may be reciprocated by means of a suitable cam 152 engaging a roller on the other end thereof, cam 152 being fixed on a shaft 153 journalled in bearings 154 and shaft 153 being driven, through meshing gears 155, and 156, by a shaft 157 journalled in bearings 158. Shaft 157 may be driven through gears 159, 160 by the previously described continuously driven shaft 81. Cam 152 preferably is designed to coact with intermittent gears, so that as each form 35 pauses for a brief period at station S, rod 149 will be lifted against the yielding action of a spring 161 to urge shaft 130 inwardly against spring 142, thereby engaging the clutch members 128 and 129 with each other to rotate the form one and one half revolutions, for example, against the yielding action of the knives 90. This operation cuts a circumferential strip or band 37 in the rubber layer 36 previously deposited on the form 35. After the form has turned one and one half revolutions as desired to cut the strip 37, cam 152 allows rod 149 to drop, as urged by spring 161, thereby to release clutch members 128 and 129. At this time the intermittent gears are actuated to advance the forms 35 toward succeeding operations, the form at station S being advanced to a point I (see Figure 5) intermediate station S and the stripping station R, where it pauses while another series of operations is performed at the various stations.

A disc 125a on the outer face of gear 125 may be provided with suitable recesses into which a spring-pressed pin 127a, mounted in bracket 127, is urged to insure that form 35 will stop in definite positions when they cease to be rotated. As will be understood it is preferred that the forms be carried along by the conveyor 49 and stopped at the various stations with the major axes of the wrist portion of the forms extending in the direction of travel thereof.

Referring particularly to Figures 5, 6, 9 and 20 to 22, as a form 35 passes from position I toward a stopped position at the stripping station R the previously cut band 37 may be yieldably engaged by a series of pointed hooks or pins 165, 165 which normally project inwardly slightly into the path of the moving form. While the form 35 is stopped in forward movement at station R, it may be automatically turned through one and one half revolutions while hooks 165 are simultaneously moved rearwardly and outwardly of the form. Hooks 165, being relatively close together, initially break the band or strip 37, and as they are moved away from the form the strip attached to the hooks is pulled or unwound from the form, substantially as shown in Figure 21.

The mechanism for rotating the forms 35, while the same are paused at station R, may be precisely the same as the mechanism described in connection with rotation of the forms at station S. For this reason like parts have been given like numerals (see Figures 7 and 9).

As best shown in Figures 20 and 22, the spaced pins 165 may be fixed in the ends of a pair of relatively shiftable arms 166, 166 pivoted intermediate the ends thereof at 167 to a quadrant 168, the latter being fixed on a shaft 169 suitably journalled in frame 40 and a plate 170 carried by the brackets 132, 132 on frame 40. The provision of two arms 166 swingable relative to each other on pivot 167 permits the pins 165 to conform to forms 35 having tapered sides. Quadrant 168 normally extends inwardly from shaft 169 toward the forms 35. A compression spring 171 may extend between an upturned flange 172 of an angle-iron 173 on quadrant 168 and the strip-grasping ends of arms 166, normally to urge hooks 165 in the direction of the path of the forms, until limited by a screw 174, adjustably threaded through a flange 175 on the extensions 166ᵃ of arms 166 on the other side of pivot 167, engaging flange 172.

Mounted on the free end of quadrant 168 may be a guard plate 176 which curves outwardly of path of forms 35 and forwardly of hooks 165, from a point closely adjacent the end of hooks 165. While quadrant 168 is being swung from the position thereof shown in Figure 20 to the position shown in Figure 21, form 35 from which strip 37 is to be removed being meanwhile rotated, the strip 37 while stretched between hooks 165 and form 35 conforms about plate 176. As quadrant 168 reaches the position thereof shown in Figure 21 the extensions 166ᵃ of arms 166 engage a pin 177 in plate 170, swinging arms 166 on pivot 167, against the yielding action of spring 171, thereby to disengage the hooks 165 from the end of strip 37 by withdrawing the hooks through a series of cooperating slots 178, 178 in guard-plate 176. Substantially at this point the strip 37, being disengaged both from the hooks 165 and from its form 35, snaps free into a suitable receptacle (not shown). Before the form 35 from which the strip 37 has been removed moves forwardly toward another operation the quadrant 168 is swung back to the relative position thereof shown in Figure 20, extensions 166ᵃ then disengaging pin 177 to allow the spring 171 to swing arms 166 on pivot 167, thereby to expose the ends of hooks 165 in the path of forms 35 prior to the next succeeding strip removing operation.

For intermittently reciprocating the quadrant 168 for the successive strip-removing operations as described, shaft 169 may have a crank-arm 179 fixed thereon, to the free end of which is pivotally connected at 180 one end of a link 181, the other end of the latter being pivoted to an eccentric pin 182 in a gear 183 which is rotatable in a stub shaft 184 fixed in frame 40. In engagement with gear 183 may be a gear 185 on a shaft 186, journalled in suitable bearings carried by frame 40, shaft 186 having a bevel-gear 187 engaging a bevel-gear 188 on a shaft 189 journalled in bearings 190 mounted on support 41. Shaft 189 has secured thereon a bevel-gear 191 for meshing with a gear 192 on a shaft 193, rotatable in suitable bearings in frame 40 and in a flange 194 of a U-shaped bracket 195 mounted on support 41. Another bevel-gear 196 on shaft 193 may mesh with a bevel-gear 197 on a stub shaft 198 journalled in a lug 199 of bracket 194. A shaft 200 journalled in lug 201 of bracket 194 carries a clutch member 202 which is intermittently shiftable into engagement with a cooperating clutch member 203 on shaft 198, and shaft 200 may be continuously driven, through a gear 204 thereon engaging a gear 205 on an auxiliary shaft 206 in bracket 194, by a bevel-gear 207 on shaft 206 engaging a bevel-gear 208 on continuously driven shaft 135.

The clutch members 202 and 203 may be clutchingly engaged, to reciprocate quadrant 168 simultaneously with rotation of the form 35 for the stripping operation. To this end a bell-crank 209, pivoted at 210 to support 41, has an arm 209ᵃ thereof connected to one of the rods 149, the latter being reciprocated by its respective cam 152. An arm 209ᵇ of the bell-crank may be connected by a link 211 to the free end of a lever 212, pivoted intermediate its ends at 213 to support 41, the other end of the lever being connected to clutch member 202. A suitable tension spring 214 may connect lever 212 to insure that the clutch members 202 and 203 will properly disengage. Thus reciprocation of one of the rods 149 is utilized intermittently to drive the eccentric gear 183 from continuously driven gear 208 on a shaft 135, thereby to reciprocate quadrant 168 carried by shaft 169, as previously described.

The upper end of shaft 193 may have a disc 215 thereon against which a pin 216 is spring urged, to provide a brake for the mechanism in driving connection with shaft 193 when clutch members 202 and 203 are disengaged.

The mechanism at station R, by removing the strip 37 from the forms 35, provides a straight well-defined top edge 36ᵃ at the wrist portion of the goods deposited on the forms (see Figure 3) for the purpose of rolling the reinforcing bead, as later will be described.

Referring particularly to Figures 5, 6, and 23 to 28, the forms 35 upon successively stopping at station B¹ may be yieldably engaged, at the bare wrist portions thereof, between a pair of idler rollers 218, 218 rotatable on vertical axes and a driven bead-rolling roller 219 rotatable on a horizontal axis. While a form 35 in this position is being rotated one revolution, for example, by means subsequently to be described, the bead-roller 219 preferably is continuously driven, through a flexible shaft 220 and a belt and pulley mechanism at 221, by a motor 222. The roller 219 may be tapered from a straight portion thereof to the form-entering end thereof (see Figures 5 and 24) to prevent gouging the edge portion 36ᵃ of the rubber layer 36 at the start of the bead-rolling operation, and thereby prevent formation of air blisters in the finished bead. Roller 219 preferably is of substantially soft rubber covered with a layer of chamois to reduce the friction against the forms 35 and to prevent the roller from sticking to the rubber material on the form.

Each form 35 may be turned through one revolution at station B¹, in bead-rolling engagement with roller 218, by means of sprockets 223, fixed on shafts 61 of each form-carrying head 53, meshing with circumferentially spaced pins of a continuously driven wheel 224. The latter, which is fixed on a shaft 225 suitably journalled in an upright 226 and in support 41, may be driven by a chain 227 extending between a sprocket 228 on the previously described, continuously driven, shaft 81 and an idler sprocket 229 suitably mounted on support 41, the chain 227 being engaged with sprocket 225$^b$ on shaft 225 to turn the same in the proper direction. The arrangement is such that the forms may be successively turned through one revolution during the period that sprocket 223 and wheel 224 are engaged with each other, which is substantially the period in which each form is stopped at station B$^1$.

The idler rollers 218 may be carried in the bifurcated end of a plate 230, which is laterally slidable between spaced plates 231 and 232 suitably supported on upright 226. A compression spring 233 normally urges plate 230 outwardly to urge rollers 218 slightly into the path of forms 35, as limited by a pin 234 engaging the end of a slot 235 in plate 231.

The bead roller 219 preferably is journalled in a bracket 236 on the inner end of a slide-plate 237, which is laterally yieldably shiftable in a guide plate 238 carried on a block 239, the latter being vertically and angularly adjustable on a vertical shaft 240 of a bracket 241 mounted on support 41. For yieldably urging the roller 219 toward the path of the forms 35, a link 242 may connect between the outer end of plate 237 and the free end of an arm 243, which is fixed on a shaft 244 journalled in a suitable receptacle 245 carried by a plate 246 supported by block 239. A coil spring 247 in receptacle 245 is connected at its ends to shaft 244 and the receptacle in a known manner for swinging arm 243 inwardly, as limited by a stop pin 248 on plate 246, thereby yieldably to urge slide-plate 237 inwardly. The arrangement is such that as each form-carrying head 53 stops momentarily at station B$^1$, the form 35 carried thereby is rotated in clockwise direction as viewed in Figures 5 and 24, in lateral yielding engagement between the backing rollers 218 and bead-forming roller 219. Roller 219 preferably is rotated in a counter-clockwise direction, as viewed in Figure 23 and is vertically positioned to engage the top edge 36$^a$ of the goods 36 and thereby roll down a continuous bead 38 (see Figure 4).

The forms 35 upon leaving station B$^1$ preferably pause at a second bead-rolling station B$^2$ (see Figure 5), where a bead-roller 219$^a$ on flexible shaft 220 may be positioned slightly lower than roller 219, for the purpose of further rolling the beads 38 downwardly on the forms, thereby to insure obtaining a uniform bead.

Figure 10:
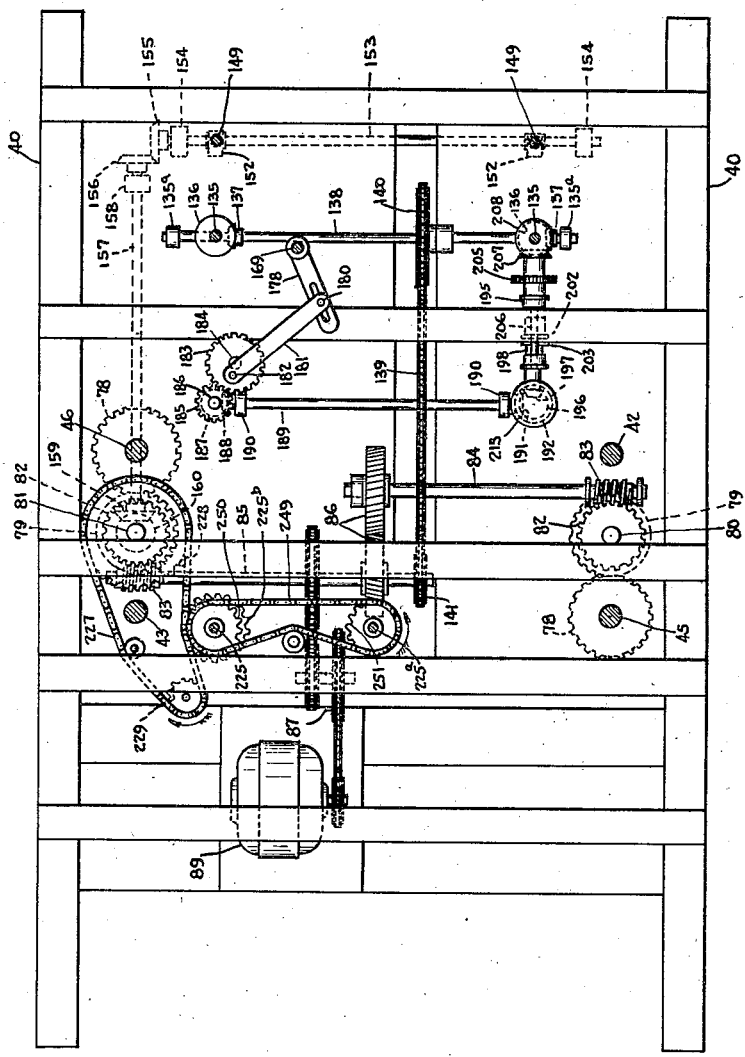
Figure 10 is a cross-section of the driving mechanism, taken substantially on line 10—10 of Figure 7.
Figure 18:
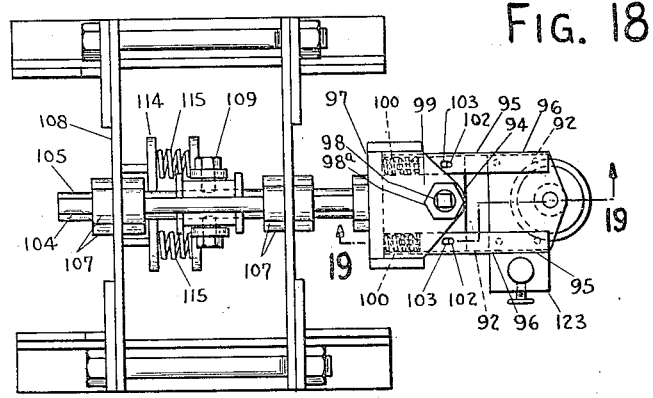
Figure 18 is a plan view, partly broken away, of Figure 16.

The bead-rolling mechanism at station B$^2$ preferably is substantially the same as that at station B$^1$, the drive for the form-turning shaft 225$^a$ thereof being obtained through a chain 249 connecting sprockets 250 and 251 on shafts 225 and shaft 225$^a$, respectively (see Figure 10).

In Figures 29 to 34 is illustrated a modified form of bead-rolling mechanism, which may readily be substituted for the bead-rolling mechanism at station B$^1$, previously described in connection with Figures 5, 6 and 23 to 28.

Disposed on opposite sides of the path of travel of forms 35 may be a pair of cooperating shiftable plates 255, 255, each of which carries a curved series of closely arranged pads or rollers 256, 256, which, when the plates 255 are shifted downwardly and inwardly by means to be described, will embrace the ovate shaped periphery of a form 35 at the portion bared by removal of a strip 37 at station R, a form 35 being stopped in its travel for this purpose (see Figure 33).

Plates 255 preferably have downwardly extending flanges 255$^a$ at the ends thereof in which are slots 256$^b$ for receiving pins 257$^a$ extending from inwardly extending legs of U-shaped supports 257, 257, the latter having downwardly extending arms 258, 258 pivotally connected at 259, 259 to the upturned ends of a U-shaped member 260. Member 260 preferably is supported on a shaft 261 which is vertically reciprocable in a bearing 262 in supporting frame 41$^a$, and an arm 263, pivoted at 264 to shaft 261, may be eccentrically connected at 265 to a shaft 266 driven in a known manner (not shown), as by mechanism similar to that used for intermittently rotating the forms at stations S and R, thereby intermittently to reciprocate the U-shaped member 260 once each time a form pauses at the bead-rolling stations. Grooved rollers 267, 267, carried by brackets 268, 268 extending inwardly from uprights 269, 269 on support 41$^a$, are positioned to engage straight edge portions 260$^a$ on member 260 to guide the same in its vertical movement. The plates 255 may be normally yieldably urged inwardly toward each other on their respective supports 257, until pins 257$^a$ abut the ends of slots 256$^b$, by means of a compression spring 258$^a$ extending between lugs 258$^b$ and 258$^c$, on arms 258 and plates 255, respectively, there being a rod 258$^d$ on each lugs 258$^c$ slidably extended through openings in lugs 258$^b$ for retaining springs 258$^a$ in place.

In all positions of the bead-forming mechanism, springs 270, 270, extending between uprights 269 and brackets 258, yieldably urge the outer edge portions 271 of brackets 258 outwardly against a pair of rollers 272, 272, mounted at the upper end of uprights 269. The outer edge portions 271 of brackets 258 preferably are formed as shown in Figures 29 and 32, to provide cam surfaces which in the inoperative position of member 260, shown in Figure 29, permit brackets 258 and the mechanism carried thereon to be swung outwardly from the path of travel of forms 35.

The rollers 256 preferably have outer layers of soft rubber covered by a layer 275 of chamois leather, and are fixed on suitably curved flexible shafts 276, 276 journalled in a plurality of lugs 277, 277 secured on the under sides of plates 255. As best shown in Figure 30, the shafts 276 may have downwardly angularly extended arms 278, 278 fixed thereon, the ends of the arms preferably being bifurcated at 279 to receive the ends of the L-shaped pins 280 carried by suitably shaped bars 281, 281. The bars 281 preferably are normally yieldably held in the downward positions thereof by means of rods 282 extending upwardly through the plates 255 and slidable in housings 283 thereon, and a spring 284 may be provided in each housing for yieldably urging a collar 285 on rod 282 against plate 255.

Downward movement of U-shaped member 260 causes rollers 272 to engage raised portions on cam surface 271 of arms 258, thereby yieldably to urge the rollers inwardly initially to engage the portion on a form 35 bared by removal of a strip 37 by a previous strip removing operation at station R, the form 35 having been conveyed into a stopped cooperative position between the plates 255 by the conveyor mechanism previously described. Upon continued downward movement of plates 255 pins 286 on the bars 281 may be engageable with inwardly extending flanges 269a on the uprights 269 to urge the pins 286 upwardly against the yielding action of springs 284, the pins 280 on bars 281 thereby swinging arms 278 on shafts 276 upwardly and rolling rollers 256 downwardly about the forms 35 (see Figures 31 to 34). This downward and rolling action of the rollers 256 engages the top edge 36a of the rubber layer 36 on the form and rolls a continuous bead portion on the goods. The upward stroke of member 260 conversely moves the plates 155, carrying rollers 256, upwardly and outwardly away from form 35 to allow the latter to be carried forwardly to the next operating station.

Before describing the continuous operation of the complete apparatus previously described it first should be understood that informing dipped rubber latex or the like it has been the practice to perform the dipping operations with the finger portions of the forms extending upwardly in the latex tank (not shown) to obtain goods of uniform thickness. This of course forms a layer of rubber all over the form, including the usual flat end portion thereof. Heretofore, it has been difficult to trim the excess rubber away from the flat or wrist end of the glove by mechanical means and still leave a well defined edge for forming the bead on the glove.

In the operation of the glove making apparatus the glove forms 35, having layers of rubber completely covering the same, are first releasably attached at the lower ends of form-carrying heads 53, by means of the attaching mechanism 62 (see Figures 12 and 14), while the heads 53 are progressively stopped at station L. As these forms are supplied to the heads 53 the continuously driven motor 89, through intermittent gearing 78, 79, progressively carries the forms 35 to momentary stopping positions at the various operating stations.

Upon stopping at station S the forms 35 yieldably engage the heated pair of knives 90 so that rotation of the forms against the knives cuts a continuous band or strip 37 in the glove 36 to trim the same to predetermined length. The yielding action of the springs 100 and 101 between bracket 97 and slide bars 92, 93 allows the knives 90 to be laterally relatively shiftable to conform to forms 35 having either vertically straight or slightly tapered wrist portions thereon. The springs 115 and 119 acting on the arms 110 and 116 (see Figure 16) yieldably allow the bracket 97 to shift laterally, thereby to conform knives 90 with substantially uniform pressure to ovate or otherwise irregular cross-sections of the wrist portions of forms 35 as the forms are rotated.

As the heads move from position I toward a stop position at station R the hooks 165 carried by quadrant 168 engage the continuous strip 37 to pull it away from the form 35, as shown in Figure 20. Simultaneously with rotation of the form 35, in a counter-clockwise direction as viewed in Figure 21, the quadrant 168 is swung on its pivot 169 to unwind the strip from the form, whereupon the extension 166a engaging pin 177 withdraws the hooks 165 through slots 178 in guard 176, the hooks thereby becoming disengaged from the broken end of the strip 37 to allow the strip which has been in stretched condition, to snap free and drop into a suitable receptacle (not shown). Removal of strip 37 leaves a well-defined top edge 36a on the goods 36 and removes a sufficient amount of excess rubber stock adjacent said edge to facilitate rolling the reinforcing beads on the goods at stations B¹ and B². Before the forms 35 leave station R quadrant 168 is swung back to the position thereof shown in Figure 20 for the next succeeding stripping operation.

Figure 9:
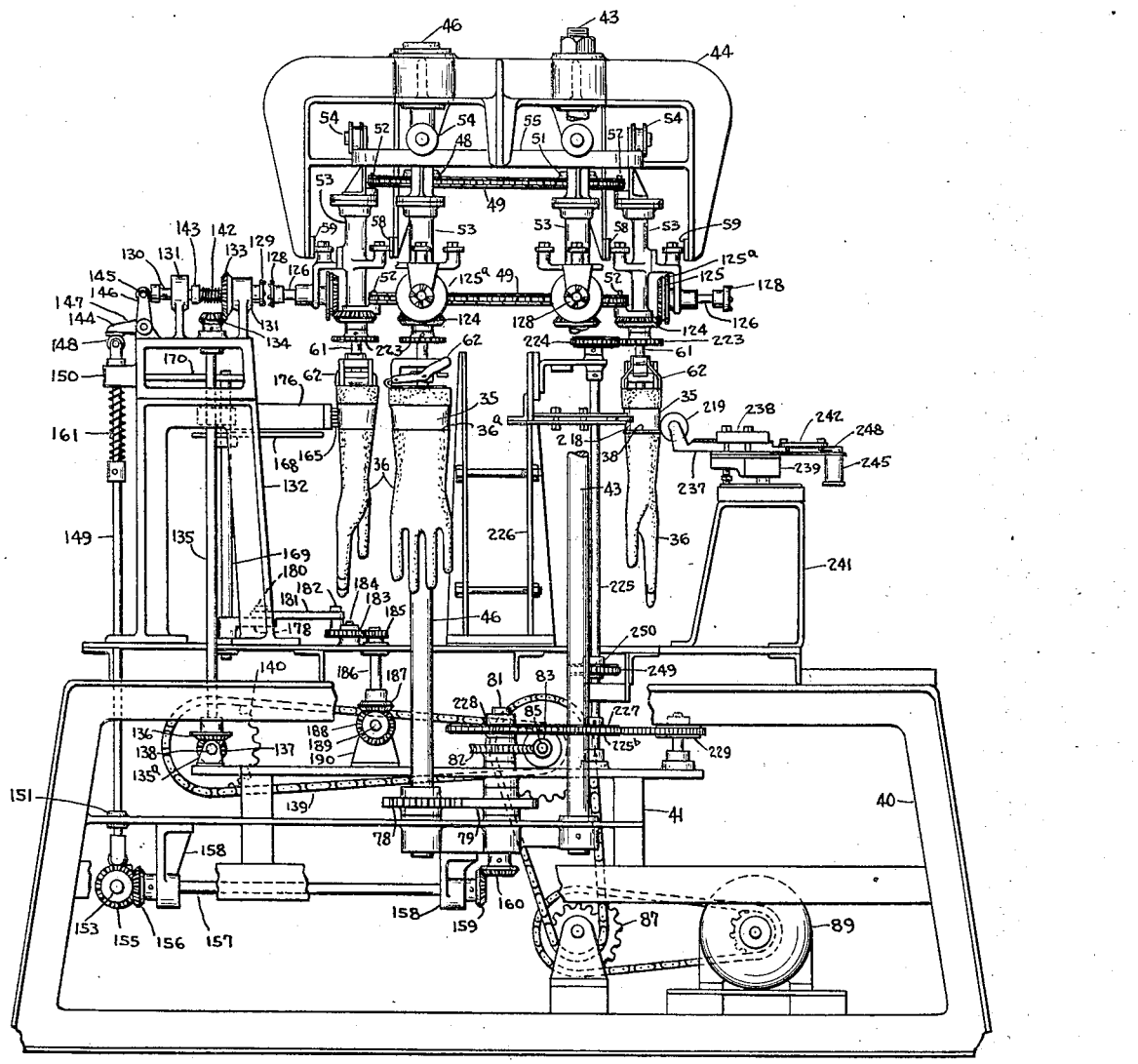
Figure 9 is an end elevation, partly broken away in parts, of the apparatus shown in Figure 6, as viewed from the left thereof.

After leaving station R the forms 35 progressively are stopped at stations B¹ and B² where, as best shown in Figures 9 and 23, the continuously driven rollers 219 engage the top edge 36a of goods 36 to roll down the beads 38 as the forms are rotated by means of sprocket 223 on shafts 61 engaging the driven wheel 224. A uniform yielding pressure of the roller 219 against forms 35, as the latter are rotated, is obtained through the spring 247 acting on slide plate 237 carrying roller 219 and spring 233 acting on plate 230 carrying rollers 218, thereby to accommodate the ovate cross-section of the forms. It is understood that the bead rolling operation may also be performed by means of the mechanism shown in Figures 29 to 34 and previously described.

The forms 35 with the finished goods 36 thereon may be removed by releasing mechanism 62. while the form-carrying heads 53 are stopped adjacent station L. From this point the forms may be transported to the usual vulcanizing apparatus. The excess rubber stock at the flat end of the form may be removed either before or after the vulcanizing step in any suitable manner as will be understood.

Modifications of the invention may be resorted to without departing from the spirit thereof or the scope of the appended claims.

What is claimed is:

1. Apparatus of the character described comprising the combination with a conveyor for carrying a form having a rubber article thereon, a pair of cutters for engaging said form while on the conveyor to cut a continuous strip about the periphery of said article and thereby to cut the article to length with a trimmed edge, means for removing said strip from said form, and means for rolling the material at said trimmed edge of the article to form a continuous bead.

2. Apparatus of the character described comprising the combination with a conveyor for carrying a rotatable form having a rubber article thereon, of means for rotating said form, a pair of knives for engaging said form as it is rotated to cut a continuous strip about the periphery of said article, and thereby cut the article to length with a trimmed edge means for removing said strip from said form, and means for rolling the material at said trimmed edge of the article to form a continuous bead.

3. Apparatus of the character described comprising the combination with a conveyor for carrying a rotatable form having a rubber article thereon, of means for rotating said form, a pair of knives shiftable of each other and relatively of said form for engaging said form as it is rotated to cut a continuous strip about the periphery of said article, and thereby cut the article to length with a trimmed edge, means for removing said strip from said form, and means for rolling the material at said trimmed edge portion of the article to form a continuous bead.

4. Apparatus of the character described comprising the combination with a conveyor for carrying rotatable forms having rubber articles thereon, of means for intermittently driving said conveyor progressively to stop said forms at a series of operating stations, including trimming, strip-removing and bead-rolling stations, means for intermittently rotating said forms at said stations, a pair of cutters at said trimming station for engaging a form to cut a continuous strip about the periphery of the article thereon while said form is rotating, and thereby cut the article to length with a trimmed edge, means at said strip-removing station for engaging and progressively removing said strip from said form while said form is rotating, and means at said bead-rolling station for engaging the trimmed edge portion of said article to roll a continuous bead thereon.

5. Apparatus of the character described comprising the combination with a conveyor for carrying a plurality of rotatable forms having rubber articles thereon, of a laterally shiftable support, a pair of spaced cutters relatively shiftably mounted on said support yieldable means for normally maintaining said cutters in substantial alignment on said support, yieldable means for urging said support to engage said cutters with said forms at spaced points thereon, and means for rotating said forms while the same are engaged with said cutters to provide spaced peripheral cuts on articles on said forms, thereby to cut peripheral strip in the excess rubber of said articles, and means for removing said strips from the forms to provide trimmed edges on the articles thereon.

6. Apparatus of the character described comprising the combination with a form for having a rubber or like article thereon, of a laterally shiftable support, a pair of spaced cutters on said support, yieldable means for urging said support to engage said cutters with said form, and means for rotating said form while it is engaged with said cutters to make spaced peripheral cuts in the excess rubber of an article on the form, thereby to cut a continuous strip of excess rubber from the body of said article to provide a trimmed edge thereon.

7. Apparatus of the characters described comprising the combination with a rotatable form, of substantially yieldable means normally positioned yieldingly to engage said form to grasp a strip of material thereon, means for shifting said grasping means outwardly of said form to pull the strip from the form, means for rotating said form simultaneously with said outward movement of said grasping means to unwind said strip from said form, and means for releasing said strip from said grasping means.

8. Apparatus of the character described comprising the combination with a rotatable form, of means normally positioned yieldingly to engage said form to grasp a continuous peripheral strip of flexible frangible material thereon, means for shifting said grasping means outwardly of said form, means for rotating said form simultaneously with said outward movement of said grasping means to sever said strip and unwind the same from said form, and means for releasing said strip from said grasping means.

9. Apparatus of the character described comprising the combination with a form, of means normally positioned yieldingly to engage said form to grasp a continuous peripheral strip of frangible material thereon, means for shifting said grasping means outwardly of said form, and means for relatively moving said form transversely with respect to said grasping means simultaneously with said outward shifting of the grasping means to sever and remove said strip from said form.

10. Apparatus of the character described comprising the combination with a form, of means for grasping a continuous peripheral strip of frangible material on said form, means for relatively shifting said grasping means and form to pull said strip outwardly of the form and thereby sever the strip, and means for releasing the severed strip from said grasping means after the strip is pulled from the form.

11. Apparatus of the character described comprising the combination with a form, of yieldable means yieldingly engageable with said form for grasping a continuous strip of frangible material on said form, and means for relatively shifting said grasping means and form to pull said strip from the form, thereby to sever the strip and release the same from the form.

12. Apparatus of the character described comprising the combinaiton with a curvilinear form for a rubber article, of a shiftable support, a member yieldably shiftably mounted on said support, a curvilinear flexible shaft rotatable on said shiftable member, a series of rubbing elements mounted on said shaft, means for shifting said support longitudinally of said form, and means for rotating said shaft to turn said elements against the form in the direction of said longitudinal movement of said elements to roll a bead at an open end of said article, said elements engaging the form against the yieldable shifting action of said member on said support.

13. Apparatus of the character described comprising the combination with a form for a rubber article, of a shiftable support, a yieldable member relatively shiftable on said support, a curvilinear flexible shaft rotatable on said member, a series of rubbing elements on said shaft, means for shifting said support toward said form to engage said elements about said form, means for shifting said support longitudinally of said form, and means operable by said longitudinal shifting of said support for rotating said shaft to turn said elements against the form in the direction of said longitudinal movement of said elements to roll a bead at an open end of said article.

14. Apparatus of the character described comprising the combination with a form for a rubber article, of a shiftable support, a yieldable member relatively shiftable on said support, a curvilinear flexible shaft rotatable on said member, a series of rubbing elements on said shaft, means for shifting said support toward said form to engage said elements about said form, means for shifting said support longitudinally of said form, and means yieldingly operable by said longitudinal shifting of said support for rotating said shaft to turn said elements against the form in the direction of said longitudinal movement of said elements to roll a bead at an open end of said article.

15. Apparatus of the character described comprising the combination with a rotatable form for a rubber article, of means for rotating said form, a support, a rotatable roller on said support, means for rotating said roller, and yieldable means for shifting said support transversely of the form yieldingly to engage said roller with said form while the form is rotated, thereby to roll a continuous bead about an open end of said article, said urging means yieldingly permitting said roller to conform to the peripheral shape of said form as it is rotated.

16. A method of forming the beads on open ended thin rubber articles, which comprises providing a form having a coating of rubber or the like thereon, making cuts in said article against said form to cut a peripheral strip in said article, thereby to provide a well-defined edge portion for an open end of said article, removing said strip from said form, and rolling a continuous bead at said edge portion.

17. A device for removably supporting a form or the like having spaced edge portions, comprising a mounting, means on said mounting compressible to engage said edge portions of a form or the like, elements on said compressible means for engaging under said edge portions of the form when said means is decompressed, and releasable means on said mounting in association with said compressible means operable for clamping said edge portions against said elements removably to secure the form on said mounting.

18. Apparatus of the class described comprising a conveyor, a series of rotatable forms on said conveyor, a rotatable bead-rolling element arranged at a station on said conveyor means for intermittently driving said conveyor progressively to stop said forms at said station, means for rotating said forms while at said station, said element engaging forms moving into said station progressively to roll beads on the articles, and yieldable means for yieldingly holding said bead-rolling element against said forms, said yieldable means yieldingly permitting said roller to conform to substantial variations in the peripheral shape of said form as it is rotated.

19. Apparatus of the class described comprising a conveyor, forms rotatably mounted on said conveyor, bead-rolling equipment at a station along said conveyor for engaging a form in said conveyor, means for intermittently driving said conveyor progressively to stop said forms at said station, means at said station for rotating a form while stopped at said station and while in engagement with the bead-rolling equipment, said bead-rolling equipment comprising a rotatable bead-rolling element at one side of the conveyor and a form-backing element at the other side of the conveyor having rolling engagement with the form opposite the bead-rolling element, said bead-rolling element and said backing being relatively movable transversely of the form and relatively of each other whereby the form will rotate in contact with both the backing element and the bead-roller regardless of the cross-sectional shape of the form.

20. Apparatus of the character described comprising the combination with a conveyor carrying a plurality of rotatable forms for rubber articles, of means for intermittently driving said conveyor progressively to stop said forms at a bead-rolling station, means for rotating said forms while stopped at said station, a support mounted at said station to be yieldingly shiftable transversely of the path of said forms, a bead-roller mounted on said support for yieldingly engaging a form at said station, means for rotating said roller while a form at said station is rotating to roll a continuous bead on an article on the form, said yieldingly shiftable support permitting said roller to conform to substantial variations in the peripheral shape of said form as it is rotated.

OTTO A. STRASSMAN.